(12) United States Patent
Szoucsek

(10) Patent No.: US 12,228,252 B2
(45) Date of Patent: Feb. 18, 2025

(54) METHOD FOR REFUELLING A MOTOR VEHICLE, MOTOR VEHICLE, FILLING STATION AND COMPUTER-READABLE STORAGE MEDIUM

(71) Applicant: Bayerische Motoren Werke Aktiengesellschaft, Munich (DE)

(72) Inventor: Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/766,958

(22) PCT Filed: Oct. 6, 2020

(86) PCT No.: PCT/EP2020/077943
§ 371 (c)(1),
(2) Date: Apr. 6, 2022

(87) PCT Pub. No.: WO2021/069412
PCT Pub. Date: Apr. 15, 2021

(65) Prior Publication Data
US 2024/0068621 A1    Feb. 29, 2024

(30) Foreign Application Priority Data
Oct. 7, 2019    (DE) .................... 10 2019 126 878.8

(51) Int. Cl.
*F17C 5/00*    (2006.01)
(52) U.S. Cl.
CPC ........ *F17C 5/007* (2013.01); *F17C 2250/032* (2013.01); *F17C 2250/034* (2013.01);
(Continued)

(58) Field of Classification Search
CPC .. F17C 13/026; F17C 5/007; F17C 2250/032; F17C 2250/034; F17C 2250/0439;
(Continued)

(56) References Cited

U.S. PATENT DOCUMENTS 6,213,393 B1 * 4/2001 Streicher ................ B67D 7/346
141/94
11,376,950 B2 * 7/2022 Szoucsek ............... B60K 15/05
(Continued)

FOREIGN PATENT DOCUMENTS

| CN | 103133867 A | 6/2013 |
|---|---|---|
| CN | 106795997 A | 5/2017 |

(Continued)

OTHER PUBLICATIONS

Chinese-language Office Action issued in Chinese Application No. 202080069216. dated Mar. 1, 2023 with English translation (18 pages).

(Continued)

*Primary Examiner* — Timothy L Maust
(74) *Attorney, Agent, or Firm* — Crowell & Moring LLP

(57) ABSTRACT

A method is provided for refueling a motor vehicle. The method include the steps of: acquiring at least one signal, wherein the signal contains information as to whether the motor vehicle has at least one device for preventing follow-up refueling; and providing fuel in accordance with the acquired signal.

13 Claims, 2 Drawing Sheets

(52) U.S. Cl.
CPC .............. *F17C 2250/0439* (2013.01); *F17C 2250/0636* (2013.01); *F17C 2250/0689* (2013.01); *F17C 2265/065* (2013.01)

(58) Field of Classification Search
CPC ....... F17C 2250/0636; F17C 2265/065; B67D 7/08; B67D 7/32; B67D 2007/0451
USPC .......................................................... 141/94
See application file for complete search history.

(56) References Cited

U.S. PATENT DOCUMENTS

| | | | |
|---|---|---|---|
| 2005/0193989 A1 | 9/2005 | Veenstra et al. | |
| 2012/0318378 A1 | 12/2012 | Yahashi et al. | |
| 2013/0139897 A1 | 6/2013 | Kim et al. | |
| 2015/0362383 A1* | 12/2015 | Komiya | F17C 13/025 702/99 |
| 2015/0377416 A1 | 12/2015 | Miyoshi et al. | |
| 2016/0305611 A1 | 10/2016 | Handa | |
| 2017/0074456 A1 | 3/2017 | Handa | |
| 2017/0225939 A1 | 8/2017 | Kunberger | |
| 2018/0135994 A1 | 5/2018 | Stahl et al. | |
| 2019/0170299 A1 | 6/2019 | Hettenkofer et al. | |
| 2019/0203886 A1 | 7/2019 | Pelger | |
| 2020/0391587 A1 | 12/2020 | Szoucsek | |

FOREIGN PATENT DOCUMENTS

| | | | | |
|---|---|---|---|---|
| CN | 107690550 A | | 2/2018 | |
| CN | 109416148 A | | 3/2019 | |
| CN | 109690170 A | | 4/2019 | |
| DE | 10 2005 009 823 A1 | | 9/2005 | |
| DE | 11 2011 100 541 B4 | | 6/2014 | |
| DE | 10 2013 211 765 A1 | | 12/2014 | |
| DE | 11 2013 002 339 T5 | | 3/2015 | |
| DE | 10 2015 110 263 A1 | | 12/2015 | |
| DE | 10 2016 206 070 A1 | | 10/2016 | |
| DE | 10 2016 217 258 A1 | | 3/2017 | |
| DE | 10 2015 221 397 A1 | | 5/2017 | |
| DE | 10 2016 225 193 A1 | | 6/2018 | |
| DE | 10 2017 222 080 A1 | | 6/2019 | |
| JP | 2013-253672 A | | 12/2013 | |
| WO | WO-2019083534 A1 * | | 5/2019 | ............ B60K 15/03 |

OTHER PUBLICATIONS

International Search Report (PCT/ISA/210) issued in PCT Application No. PCT/EP2020/077943 dated Feb. 15, 2021 with English translation (five (5) pages).

German-language Written Opinion (PCT/ISA/237) issued in PCT Application No. PCT/EP2020/077943 dated Feb. 15, 2021 (nine (9) pages).

German-language Search Report issued in German Application No. 10 2019 126 878.8 dated May 25, 2020 with partial English translation (12 pages).

* cited by examiner

METHOD FOR REFUELLING A MOTOR VEHICLE, MOTOR VEHICLE, FILLING STATION AND COMPUTER-READABLE STORAGE MEDIUM

BACKGROUND AND SUMMARY

Refueling at different refueling temperatures is known from the technical standard SAE J2601 in the version of December 2016. The above-mentioned standard defines refueling parameters to enable refueling within 3 minutes, wherein the fuel flows into the motor vehicle at a fuel temperature of approximately −40° C. Furthermore, the above-mentioned standard also regulates the refueling at fuel temperatures of approximately −30° C. and approximately −20° C.

Filling stations which provide the fuel at these temperatures are comparatively capital-intensive. Presently, few gaseous-fuel powered motor vehicles are already in operation. The filling stations for gas-powered motor vehicles are therefore amortized only after many years. This has the result that the build-out of a comprehensive filling station network only progresses slowly. The inadequate infrastructure in turn has the result that potential customers do not acquire a gas-powered motor vehicle. A chicken and egg problem thus exists, which could be solved by a cost-effective filling station infrastructure. Cost-effective filling stations can thus significantly contribute to the propagation of gas-powered motor vehicles.

Filling stations for warm gas refueling (for example at ambient temperature) are known from the prior art. These filling stations are less capital-intensive. The disadvantage of this technology is that more heat is introduced into the pressure vessel of the motor vehicle. This can interfere with follow-up refuelings.

As FIG. 1 shows, for example, warm gas refueling can begin at an ambient temperature $T_U$ and end at a temperature $T_{b1}$ and a pressure $p_{b1}$ (shown as a solid line). Subsequently, the motor vehicle is operated, due to which the pressure decreases to the pressure $p_{b2}$ and the temperature decreases to the temperature $T_{b2}$ (shown by dotted line). If the motor vehicle is then refueled again at another filling station even before the pressure vessel can cool down to the ambient temperature $T_U$, this could have the result that during the follow-up refueling before cooling of the pressure vessel (shown by dashed line), the pressure vessel would heat up too strongly ($T_{b3} > T_G$).

It is a preferred object of the technology disclosed here to reduce or remedy at least one disadvantage of a previously known solution or to propose an alternative solution. It is in particular a preferred object of the technology disclosed here to safely allow warm refueling. Further preferred objects can result from the advantageous effects of the technology disclosed here.

The object(s) is/are achieved by the subject matter of the independent claims. The dependent claims represent preferred embodiments.

The technology disclosed here relates to a gaseous-fuel (referred to as gas) powered motor vehicle (e.g. passenger vehicles, motorcycles, utility vehicles). The motor vehicle comprises a pressure vessel system for storing fuel which is gaseous under ambient conditions. The pressure vessel system can be used, for example, in a motor vehicle which is operated using compressed natural gas (CNG) or liquefied natural gas (LNG) or using hydrogen. The pressure vessel system is fluidically connected to at least one energy converter, which is configured to convert the chemical energy of the fuel into other forms of energy. Such a pressure vessel system comprises at least one pressure vessel, in particular a composite overwrapped pressure vessel. The pressure vessel can be, for example, a cryogenic pressure vessel or a high-pressure gas vessel. High-pressure gas vessels are designed to permanently store fuel at ambient temperatures at a nominal operating pressure (also called nominal working pressure or NWP) of approximately 350 barg (=gauge pressure in relation to the atmospheric pressure), furthermore preferably of approximately 700 barg or more. A cryogenic pressure vessel is suitable for storing the fuel at the above-mentioned operating pressures even at temperatures which are significantly below the operating temperature of the motor vehicle.

The motor vehicle comprises:
a communication interface for communication with a filling station,
at least one device for preventing a follow-up refueling; and
at least one device for providing a signal, in particular for a filling station, wherein the signal directly or indirectly contains an item of information as to whether the motor vehicle has the at least one device for preventing a follow-up refueling.

A follow-up refueling is a refueling which follows a (prior) refueling. A follow-up refueling is in particular a refueling in which, between the follow-up refueling and the prior refueling, a filling station-side refueling coupling was withdrawn from the motor vehicle after the prior refueling. In particular, the device for preventing a follow-up refueling is configured to prevent an impermissible follow-up refueling. Such a follow-up refueling is in particular impermissible if there is the risk that at least one pressurized container or the fuel stored therein will exceed a limiting temperature during the follow-up refueling. The limiting temperature is the maximum temperature which the pressure vessel or the fuel stored therein can assume. The limiting temperature can be, for example, 85° C.

The device for preventing the follow-up refueling can be implemented, for example, by a valve, in particular by a normally closed solenoid valve, which is configured to interrupt the refueling flow path on the vehicle side, and which is expediently arranged directly behind the vehicle-side refueling coupling or as an on-tank valve or tank shutoff valve directly on the pressure vessel. The motor vehicle disclosed here can preferably be configured to close the refueling path if an impermissible follow-up refueling was initiated. Alternatively or additionally, it can be provided that a tank flap is not released for an impermissible refueling and remains closed.

The device for preventing the follow-up refueling can be configured to ascertain the difference between the current fuel temperature in the pressure vessel and the ambient temperature, and to prevent a follow-up refueling if the difference between the fuel temperature in the pressure vessel and the ambient temperature is greater than a limiting value, for example 10 K or 20 K. If the difference is greater than the limiting value, there is thus the risk that the fuel in the pressure vessel will exceed the limiting temperature. For this reason, a follow-up refueling is assessed as impermissible if the difference between the current fuel temperature and the ambient temperature is greater than the limiting value.

The device for preventing the follow-up refueling and the device for providing a signal are configured in particular to carry out the method steps disclosed here of "detecting at least one signal" and "providing fuel".

The technology disclosed here furthermore relates to a filling station, comprising:
- a detection device for detecting at least one signal, wherein the signal directly or indirectly contains the information as to whether the motor vehicle has at least one device for preventing a follow-up refueling; and
- a provision device for providing fuel in dependence on the detected signal.

The motor vehicle and the filling station can have, for example, a communication interface for communication with one another, in particular an infrared data interface. Such an infrared data interface is already in use in many forms. Alternatively, other wired or wireless interfaces are also conceivable. Expediently, an infrared receiver is provided on the filling station-side refueling coupling (nozzle) and an infrared emitter is provided on the vehicle side directly adjacent to the vehicle-side refueling coupling (receptacle).

In particular, the motor vehicle and/or the filling station are configured to carry out one of the methods disclosed here.

The motor vehicle disclosed here and/or the filling station disclosed here furthermore comprise at least one control unit. The control unit is configured, among other things, to carry out the method steps disclosed here. For this purpose, the control unit can at least partially and preferably completely regulate (closed-loop control) or control (open-loop control) possible actuators and transmit signals to the communication interface. The technology disclosed here furthermore relates to a computer-readable storage medium, on which program instructions are stored, which, upon execution by a microprocessor, prompt it to carry out at least one of the methods disclosed here.

The technology disclosed here furthermore comprises a method for refueling a motor vehicle, in particular for refueling the motor vehicle disclosed here. The method comprises the following steps:
- detecting at least one signal, in particular of the motor vehicle, expediently by a filling station; wherein the signal directly or indirectly contains the information as to whether the motor vehicle has at least one device for preventing a follow-up refueling; and
- providing fuel from a filling station, in particular the filling station disclosed here, in dependence on the detected signal.

The method can preferably comprise the step according to which the at least one signal is transferred via a communication interface. The communication interface is preferably used, via which data about the at least one pressure vessel of the motor vehicle and/or about the fuel stored in the pressure vessel are also transferred. In particular, the signal can additionally comprise items of information about the temperature and/or the pressure of the fuel in the at least one pressure vessel. Furthermore, the signal can preferably comprise items of information about the storage volume of the pressure vessel or the pressure vessels. In particular, the infrared interface disclosed here can be used for this purpose.

The signal can alternatively or additionally, however, be detected directly by a filling station in any other suitable manner. For example, on the motor vehicles which have a device for preventing a follow-up refueling, a measure for identifying the device by the filling station can be provided. For example, a coded sign (for example barcode, matrix code, etc.) can be provided in the motor vehicle, in particular in the windshield or adjacent to the vehicle-side refueling coupling, which can be detected on the part of the filling station by image recognition algorithms or scanners, and which is indicative of the device for preventing the follow-up refueling. Furthermore, it can be provided that a measure (for example projection or depression) is provided on the vehicle-side refueling coupling, which can be detected via a sensor system on the filling station-side refueling coupling, and which is indicative of the device for preventing the follow-up refueling.

The device for preventing the follow-up refueling can also be detected indirectly. For example, the motor vehicle model can be detected, in particular: i) by a user input at the filling station, ii) by image recognition algorithms of the filling station which identify the motor vehicle model, and/or iii) on the basis of a corresponding item of information in the communication signal. It can subsequently be checked on the basis of a database whether the motor vehicle model has a device for preventing the follow-up refueling. The information thus obtained could be checked for plausibility on the basis of the tank volume communicated by the motor vehicle.

The technology disclosed here can comprise the step according to which the fuel is provided by the filling station at different flow rates in dependence on the at least one signal. The flow rates have values which are greater than zero. The flow rate can be, for example, the fuel mass flow rate or the fuel volume flow rate which flows into the motor vehicle during the refueling.

The technology disclosed here can comprise the step according to which the fuel is provided at a first flow rate if the signal contains the information that the motor vehicle:
i) does not have a device for preventing a follow-up refueling,
ii) has a defective device for preventing a follow-up refueling, or
iii) no signal was detected.

The fuel can furthermore be provided at a second flow rate if the signal contains information that the motor vehicle has at least one device for preventing a follow-up refueling. The first flow rate is expediently lower or less than the second flow rate, so that the fuel flows more slowly into the pressure vessel/vessels to be filled.

The first flow rate is expediently selected so that the fuel is heated by the refueling by at most 30 K or by at most 20 K or at most 10 K. A follow-up refueling subsequent thereto does not result in overheating of the pressure vessel due to the low heat introduction even if this follow-up refueling is carried out shortly after the end of refueling. Such a follow-up refueling would not be impermissible and therefore also would not have to be prevented. The first low flow rate thus ensures that the at least one pressure vessel can already emit sufficient heat to the surroundings during the refueling so that it heats up only insignificantly or not at all.

The method disclosed here can comprise the step according to which the second flow rate is selected so that the fuel is heated by the refueling by at least 30 K or by at least 40 K or at least 50 K, so that the shortest possible refueling duration is achieved. This second flow rate can expediently be selected so that the temperature of the at least one pressure vessel or the fuel stored therein is close to the limiting temperature without exceeding it. For example, the temperature after the end of refueling at the second flow rate can be approximately 70° C. or 75° C. or 80° C. Such a refueling at a high second flow rate of fuel ensures that the at least one pressure vessel is substantially filled in the shortest possible time.

The disclosed technology is particularly preferably used in the case of a refueling in which the fuel temperature during the refueling, in particular at the refueling coupling, is greater than −17° C. or greater than −2.5° C. or ambient temperature. The fuel is particularly preferably provided unrefrigerated to the motor vehicle. Furthermore, the fuel temperature during the refueling can preferably be less than 50° C. or less than 40° C. or less than 35° C. The refueling time, in particular in the case of warm refueling, may advantageously be reduced multiple times using the technology disclosed here. Comparatively cost-effective filling stations may thus be implemented, which can preferably dispense with complex cooling of the fuel. At the same time, the filling stations designed in this way are capable of sufficiently refueling motor vehicles in a time acceptable to vehicle drivers, so that the customer acceptance of such filling stations—and thus of gas-powered motor vehicles—can be improved.

The target fill level of the pressure vessel is a measure of the amount of fuel which is to be present in the pressure vessel after the refueling. The target fill level can be specified by a user and/or at the filling station. For example, the maximum permissible refueling pressure of the filling station can be specified at the filling station as the target fill level, if the user does not specify a lower target fill level by user input. The second flow rate is selected so that the target fill level is reached as quickly as possible and at the same time the temperature in the pressure vessel does not exceed the temperature limiting value. The flow rate may be determined on the basis of the target fill level, the thermal behavior of the pressure vessel, the ambient temperature, and the temperature of the inflowing fuel. In one embodiment, characteristic maps created experimentally and/or by simulation can be stored for this purpose in the filling station-side control unit.

The technology disclosed here can comprise the step according to which during the refueling the signal is still detected, wherein after an abort or an interruption of the signal during the refueling, the refueling is continued, and wherein the target fill level to be reached is decreased, for example by 2% to 30% or by 10% to 20%. If the signal is then no longer detected by the filling station, the pressure vessel can still be refueled at the same second flow rate, wherein the refueling is ended upon reaching the reduced target fill level, however. Less heat is thus introduced into the pressure vessel in the event of communication abort. The probability that the pressure vessel will be thermally overloaded is thus decreased.

The target fill level can be an absolute value, for example the fuel storage pressure or the fuel storage density of the fuel stored in the pressure vessel. However, the fill level can also be a percentage value which results from the quantity actually stored in the pressure vessel and the maximum storage quantity. Such a percentage value can be referred to, for example, as the fill degree (state of charge or SoC). The fill degree can be, for example, a percentage value of the maximum fuel storage pressure or density. The maximum fuel storage pressure is generally reached when the pressure vessel has reached the nominal operating pressure (also called nominal working pressure or NWP; for example 700 bar) at nominal operating temperature (for example 15° C.) under normal conditions.

In other words, the technology disclosed here relates to a motor vehicle having a device or function to prevent the follow-up refueling. This could take place, for example, via keeping the tank flap closed and/or via a solenoid shutoff valve in the refueling line. Motor vehicles which contain such a protective device can report via a signal in the communication between vehicle and filling station that the motor vehicles are capable of preventing the follow-up refueling. When a filling station receives the signal, the filling station can fill the vehicle using the fastest possible refueling, which can be achieved using its technology, because it can be presumed that the vehicle can independently prevent a follow-up refueling. If the filling station does not receive the signal from the motor vehicle, for example because the communication does not function or because the vehicle does not have a protective device, the filling station is then to refuel the motor vehicle sufficiently slowly that the pressure vessel has a sufficiently small temperature increase after the refueling that a safe follow-up refueling is possible without an excessively high thermal load. If the signal is received at the beginning of the refueling by the filling station, but is no longer received in the course of the refueling, the filling station can thus furthermore presume that the motor vehicle has installed a protective device and can continue the rapid refueling until its end. The communication between motor vehicle and filling station is defined in the technical specification SAE J2799 of April 2014. A signal "receptacle type" is defined therein. A high-pressure gas system having a nominal operating pressure of 350 bar would transmit the information "RT=H35" to the filling station via the communication interface. A high-pressure gas system having a nominal operating pressure of 700 bar would transmit the information "RT=H70" to the filling station via the communication interface. A new category could now be introduced in particular for warm gas refueling, for example, H70_TA_FAST. The filling system could thus communicate that it has a protective device for follow-up refuelings.

The technology disclosed here will now be explained on the basis of the figures.

DETAILED DESCRIPTION OF THE DRAWINGS

Figure 2:
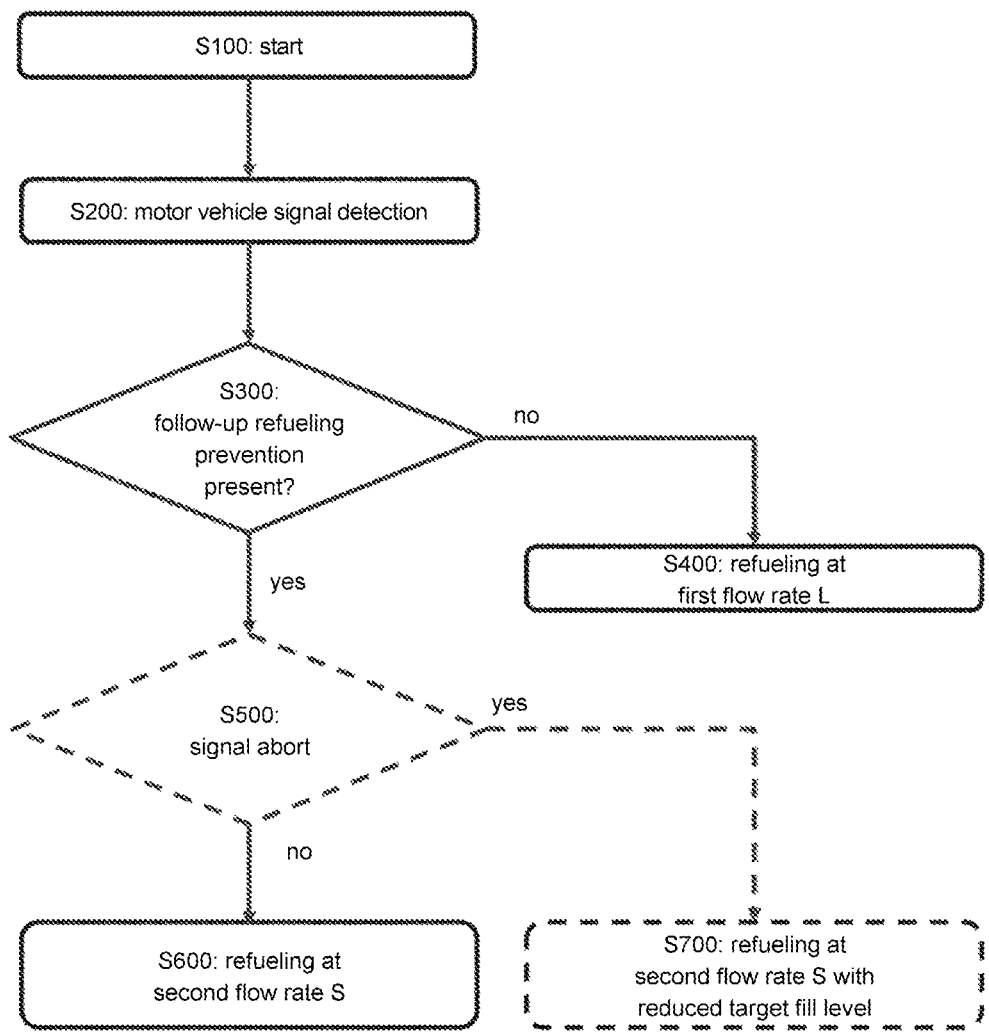
FIG. 2 is a schematic flow chart of the method disclosed here.

FIG. 2 shows a schematic flow chart of the method disclosed here. The method starts with step S100. In step S200, the filling station detects the signal, which contains the information as to whether the motor vehicle has the at least one device for preventing a follow-up refueling, from the motor vehicle to be refueled via the communication interface. This step can be initiated, for example, in that the filling station-side refueling coupling is removed from the holder and plugged onto the vehicle-side refueling coupling.

In step S300, the filling station checks on the basis of the information of the detected signal whether the motor vehicle has at least one device for preventing a follow-up refueling. If no communication signal is received from the motor vehicle from the beginning, it is assumed at the filling station that a device for preventing a follow-up refueling is not present.

If in step S300 no device for preventing a follow-up refueling was established or it is presumed that no device is present, the refueling is thus carried out at the first flow rate L in step S400. The first flow rate L is selected so that the pressure vessel only heats up sufficiently little during the refueling that after the refueling (cf. dot-dash line L in FIG.

3) and a brief journey F (cf. dotted line L in FIG. 3), a follow-up refueling (cf. dashed line in FIG. 3) would be permissible.

Figure 1:
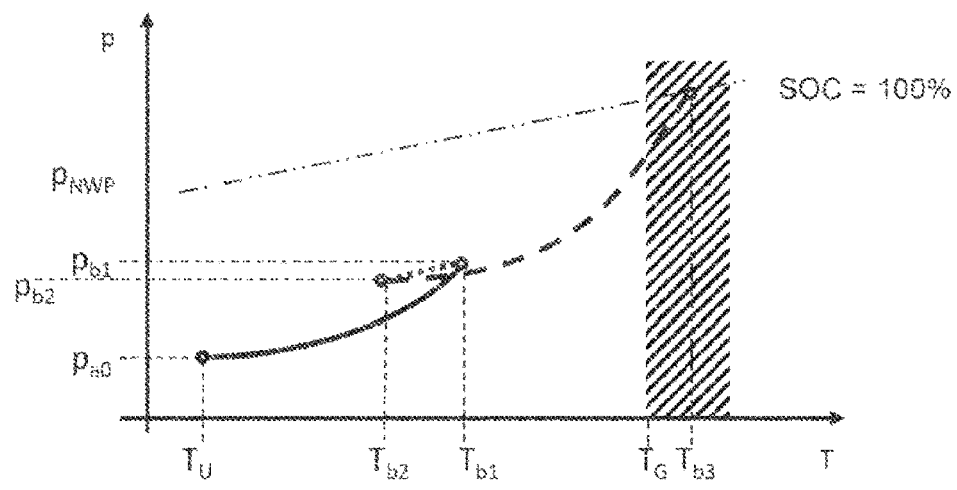
FIG. 1 is a schematic illustration of the tank heating described at the outset.
Figure 3:
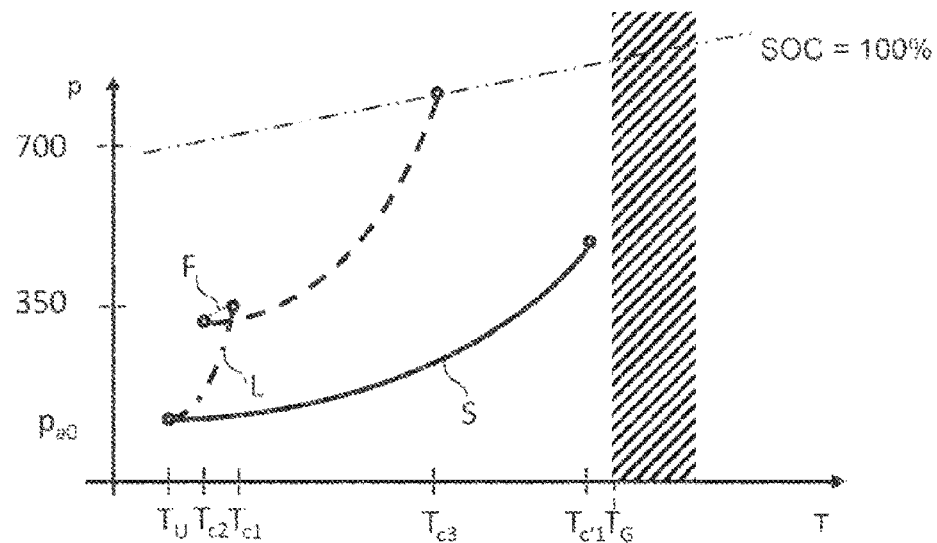
FIG. 3 is a schematic illustration of pressure and temperature in the method used here.

If in step S300 a device for preventing a follow-up refueling was established, the refueling can thus be started at the second flow rate S (cf. solid line S in FIG. 3).

In one embodiment, the method can be continued with optional step S500. It can be provided that the signal is not only detected at the beginning but rather continuously during the refueling. If the interruption or the complete abort of the communication occurs, it can thus be provided that the refueling is carried out in step S700 at the second flow rate S and is ended at a reduced target fill level. If the target fill level is reduced, the pressure vessel heats up less and a lower final temperature in the pressure vessel also results after the refueling. The probability of thermal damage to the pressure vessel can therefore be decreased further.

If the signal is therefore available the entire time during the refueling, the refueling at the second flow rate S is thus only ended when the target fill level is reached (cf. step S600).

FIG. 3 shows a schematic illustration of pressure and temperature in the pressure vessel in the method used here. The solid line shows warm refueling at the second flow rate S. It is assumed here that the first filling station is only configured to refuel motor vehicles at a nominal operating pressure of 350 bar (at 15° C.). The refueling starts at the ambient temperature $T_U$. Due to the high second flow rate S in comparison to the first flow rate L (and short refueling time resulting therefrom), the temperature increases comparatively strongly during the refueling to the final temperature $T_{c'1}$. The final temperature $T_{c'1}$ is only slightly less than the limiting temperature $T_G$. Therefore, it has to be ensured that no follow-up refueling takes place as long as the pressure vessel has not cooled to a temperature which enables a permissible follow-up refueling (for example $T_U$ or $T_{c1}$). According to the technology disclosed here, this is achieved in that only motor vehicles having a device for preventing an impermissible follow-up refueling are warm-refueled at the second flow rate S. Motor vehicles which cannot prevent impermissible follow-up refuelings are warm-refueled (shown by dot-dash line) at the first flow rate L. The first flow rate L is sufficiently low that the pressure vessel only heats up slightly during the refueling. In the example shown, the temperature increases from the ambient temperature $T_U$ to the temperature $T_{c1}$. This can be, for example, 10 K above the ambient temperature $T_U$. It is therefore advantageously ensured that a follow-up refueling would be permissible immediately after completion of the refueling since the temperature $T_{c1}$ is very far away from the limiting temperature $T_G$. If the motor vehicle is moved from the first filling station immediately to a second filling station without the pressure vessel being able to significantly cool down (cf. travel F, shown by dotted line), a refueling would now be permissible, since the temperature $T_{c2}$ now prevailing in the pressure vessel is sufficiently far away from the limiting temperature $T_G$. The second filling station is configured to entirely fill the pressure vessel designed for an operating pressure of 700 bar. Pressure p and temperature T increase strongly here. At the end of the refueling, however, the temperature is at a value $T_{c3}$ which is significantly lower than the limiting temperature $T_G$.

The preceding description of the present invention is used only for illustrative purposes and not for the purpose of restricting the invention. Various changes and modifications are possible in the context of the invention without leaving the scope of the invention and its equivalents.

The invention claimed is:

1. A method for refueling a motor vehicle, comprising:
   detecting, by a filling station, at least one signal, wherein the signal contains an item of information as to whether the motor vehicle has at least one device for preventing a follow-up refueling, the device for preventing the follow-up refueling ascertaining a difference between a current fuel temperature in a pressure vessel of the motor vehicle and an ambient temperature, and preventing the follow-up refueling when the difference is greater than a limiting value; and
   providing, by the filling station, fuel to the motor vehicle in dependence on the detected signal.

2. The method according to claim 1, wherein
   the fuel is provided at different, non-zero, flow rates in dependence on the at least one signal.

3. The method according to claim 1, wherein the fuel is provided unrefrigerated to the motor vehicle.

4. The method according to claim 1, wherein the fuel temperature during refueling at a refueling coupling is greater than −17° C. or greater than −2.5° C.

5. The method according to claim 1, wherein
   the at least one signal is transferred via a communication interface, via which data about the pressure vessel of the motor vehicle and/or about the fuel stored in the pressure vessel are also transferred.

6. A method for refueling a motor vehicle, comprising:
   detecting, by a filling station, at least one signal, wherein the signal contains an item of information as to whether the motor vehicle has at least one device for preventing a follow-up refueling; and
   providing, by the filling station, fuel to the motor vehicle in dependence on the detected signal, wherein
   the fuel is provided at different, non-zero, flow rates in dependence on the at least one signal, and
   wherein the fuel is provided at a first flow rate if the signal contains the information that the motor vehicle:
   (i) does not have a device for preventing a follow-up refueling,
   (ii) has a defective device for preventing a follow-up refueling, or
   (iii) no signal was detected;
   wherein the fuel is provided at a second flow rate if the signal contains the information that the motor vehicle has the at least one device for preventing a follow-up refueling, and
   wherein the first flow rate is less than the second flow rate.

7. The method according to claim 6, wherein
   the first flow rate is selected so that the fuel is heated by the refueling by at most 30 K or by at most 20 K or by at most 10 K.

8. The method according to claim 7, wherein
   the second flow rate is selected so that the fuel is heated by the refueling by at least 30 K or by at least 40 K or at least 50 K.

9. The method according to claim 6, wherein
   the second flow rate is selected so that the fuel is heated by the refueling by at least 30 K or by at least 40 K or at least 50 K.

10. A method for refueling a motor vehicle, comprising:
    detecting, by a filling station, at least one signal, wherein the signal contains an item of information as to whether the motor vehicle has at least one device for preventing a follow-up refueling; and
    providing, by the filling station, fuel to the motor vehicle in dependence on the detected signal, wherein the fuel is provided at different, non-zero, flow rates in dependence on the at least one signal, and wherein during refueling the signal is still detected, after an abort or an interruption of the signal during the refueling, the refueling is continued, and wherein a target fill level to be reached is decreased by 2% to 30% or by 10% to 20%.

11. A filling station, comprising:
a detection device for detecting at least one signal of a motor vehicle, wherein the signal contains information as to whether the motor vehicle has at least one device for preventing a follow-up refueling; and
a provision device for providing fuel in dependence on the detected signal,
wherein the fuel is provided at a first flow rate if the signal contains the information that the motor vehicle:
(i) does not have a device for preventing a follow-up refueling,
(ii) has a defective device for preventing a follow-up refueling, or
(iii) no signal was detected;
wherein the fuel is provided at a second flow rate if the signal contains the information that the motor vehicle has the at least one device for preventing a follow-up refueling, and
wherein the first flow rate is less than the second flow rate.

12. A motor vehicle, comprising:
at least one device for preventing a follow-up refueling; and
at least one device for providing a signal to a filling station, wherein the signal contains information usable by the filling station as to whether the motor vehicle has the at least one device for preventing a follow-up refueling,
wherein the device for preventing the follow-up refueling is configured to:
 i) ascertain a difference between a fuel temperature in a pressure vessel and an ambient temperature, and
 ii) prevent a follow-up refueling when the difference between the fuel temperature in the pressure vessel and the ambient temperature is greater than a limiting value.

13. A computer product comprising a non-transitory computer-readable storage medium, on which program instructions are stored, which, upon execution by a microprocessor, carries out the acts of:
detecting, by a filling station, at least one signal, wherein the signal contains an item of information as to whether the motor vehicle has at least one device for preventing a follow-up refueling; and
providing, by the filling station, fuel to the motor vehicle in dependence on the detected signal,
wherein the fuel is provided at a first flow rate if the signal contains the information that the motor vehicle:
(i) does not have a device for preventing a follow-up refueling,
(ii) has a defective device for preventing a follow-up refueling, or
(iii) no signal was detected;
wherein the fuel is provided at a second flow rate if the signal contains the information that the motor vehicle has the at least one device for preventing a follow-up refueling, and
wherein the first flow rate is less than the second flow rate.

* * * * *